(12) United States Patent
Schwab

(10) Patent No.: US 7,084,748 B2
(45) Date of Patent: Aug. 1, 2006

(54) WIRELESS COMMUNICATION IN VEHICLES

(75) Inventor: Manfred Schwab, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 57 days.

(21) Appl. No.: 10/505,703

(22) PCT Filed: Mar. 13, 2003

(86) PCT No.: PCT/EP03/02586

§ 371 (c)(1),
(2), (4) Date: Aug. 25, 2004

(87) PCT Pub. No.: WO03/078216

PCT Pub. Date: Sep. 25, 2003

(65) Prior Publication Data

US 2005/0164672 A1    Jul. 28, 2005

(30) Foreign Application Priority Data

Mar. 19, 2002    (DE) .............................. 102 12 039

(51) Int. Cl.
*B60Q 1/00* (2006.01)
(52) U.S. Cl. ..................................... 340/439; 307/10.1
(58) Field of Classification Search ................ 340/439, 340/825.69; 307/9.1, 10.1
See application file for complete search history.

(56) References Cited

U.S. PATENT DOCUMENTS

| | | | |
|---|---|---|---|
| 4,112,615 A | 9/1978 | Ishimoto | |
| 5,661,651 A | 8/1997 | Geschke et al. | |
| 5,749,060 A | 5/1998 | Graf et al. | |
| 5,847,671 A | 12/1998 | Sailer et al. | |
| 6,078,252 A | 6/2000 | Kulczycki et al. | |
| 6,512,974 B1 * | 1/2003 | Houston et al. | ............ 701/115 |
| 6,731,020 B1 * | 5/2004 | Burr et al. | ................. 307/10.1 |
| 6,800,958 B1 * | 10/2004 | Baer et al. | ................. 307/10.1 |
| 6,831,375 B1 * | 12/2004 | Currie et al. | ............... 307/10.1 |
| 6,956,499 B1 * | 10/2005 | Shinada | ................. 340/825.69 |
| 2003/0186652 A1 | 10/2003 | Hopf et al. | |

FOREIGN PATENT DOCUMENTS

| | | |
|---|---|---|
| AT | E 34 951 B | 8/1988 |
| DE | 34 17 956 A1 | 11/1985 |
| DE | 43 34 595 C1 | 4/1995 |
| DE | 197 34 749 A1 | 3/1999 |
| DE | 195 15 353 C2 | 12/1999 |
| DE | 199 52 391 A1 | 6/2000 |
| DE | 100 33 345 A1 | 1/2002 |
| DE | 100 40 238 A1 | 3/2002 |
| EP | 1 028 536 A2 | 8/2000 |
| EP | 1 043 192 A1 | 10/2000 |
| WO | WO-01/36233 A1 | 5/2001 |
| WO | WO-01/64484 A1 | 9/2001 |

\* cited by examiner

*Primary Examiner*—John Tweel, Jr.
(74) *Attorney, Agent, or Firm*—Davis & Bujold, P.L.L.C.

(57) ABSTRACT

In a device for communication on a communication path between control elements (18, 20, 22, 24) which are actuated by a driver of a vehicle and emit control signals and devices (4, 8) of the vehicle which receive control signals and convert the control signals into reactions in or on the devices, the control signals are transmitted from the control elements (18, 20, 22, 24) and to the devices (4, 8) in wireless manner at least on sections of the communication path.

12 Claims, 1 Drawing Sheet

WIRELESS COMMUNICATION IN VEHICLES

This application is a national stage completion of PCT/EP03/02586 filed Mar. 13, 2003 which claims priority from German Application Ser. No. 102 12 039.0 filed Mar. 19, 2002.

FIELD OF THE INVENTION

The invention relates to a device and method for wireless communication of devices in a vehicle.

BACKGROUND OF THE INVENTION

The mechanical, hydraulic or pneumatic transmissions of the driver's activities, which trigger certain responses, have been and will be replaced for many functions in the vehicle by electric lines combined with electronically controlled units which are located somewhere in the vehicle "on-site" and carry out the responses. In the technical world, this development is described under the expression "x by wire". As example for this, let it be mentioned that the E-gas function or the electronic Diesel injection designated as "drive by wire", the substitution of mechanical linkages between a switch lever and the vehicle transmission designated as "shift by wire" or the possibility of electronically controlling decelerating devices of the vehicle for which the designation "brake by wire" has prevailed. Mutual communications between separate devices in the vehicle or, for example, with a central vehicle master, are chiefly affected via a bus line, the CAN bus having already found wide circulation.

Together with the potentialities of functional improvement by uncoupling of the driver's actions and the response of the corresponding device in the vehicle, one other important reason for the development is the space saving, the higher freedom of shapes in the design of the devices and the location thereof and possible improvements of the economics. Electric cables are by nature smaller, lighter, more flexible and, at present, also mostly cheaper than corresponding mechanical, hydraulic or pneumatic transmission devices. However, for these electric lines, cables and plugs are needed which demand space and also certain requirements as to relocation and protection from environmental influences.

DE 43 34 595 C1 has disclosed a control for a motor vehicle which via CAN bus transmits the driver's actions to a transmission control and a motor control. The communication between the driver's actions and the responses of the devices in the vehicle such as transmission or motor takes place here by cable.

The problem on which the invention is based is to show, for the communication between the input of driver's actions and the response of vehicle devices, a possibility of communication.

SUMMARY OF THE INVENTION

For many transmission lines in any case when signals and not outputs are to be transmitted, an optimal solution is represented by wireless communication of information between a transmitter device, operated by the driver and an electronic control unit which controls the desired action. For this purpose is proposed a device for communication on a communication path between control elements which are actuated by a driver of a vehicle and emit control signals and devices of the vehicle which receive control signals and convert the control signals to responses in or on the drives, the transmission of the control signals from the control elements and to the device taking place in wireless manner at least in sections of the communication path.

In an advantageous development, conversion devices are provided in the control elements which, according to a transmission log book, control signals formed from the actions of the driver into control signals transmissible in a wireless manner. In controlled devices of the vehicle conversion devices are, in turn, provided which are suitable for converting according to the transmission log book control signals received which have been transmitted in wireless manner to signals to which the devices respond. Another development provides a direct wireless transmission of the control signals between the control elements and the responding devices on the whole communication path. In one other embodiment, there is provided, upon a first section of the communication path, a wireless transmission of the control signals between the control elements and one interpolated electronic control device adequate for further processing the control signals according to prescribed computation rules and relaying control signals on a second section of the communication path to responding devices of the vehicle. In one development, the second section of the communication path is designed as wireless transmission path, in another development the second section of the communication path is designed as cable path and in still another development the second section of the communication path is designed as bus system, particularly as CAN bus system. Advantageous embodiments of the invention show the controlled and responding device of the vehicle as one transmission control, in one special development as transmission control of an automatic or automated transmission. Finally in one development, the interpolated control device is designed as central vehicle computer.

BRIEF DESCRIPTION OF THE DRAWING

The invention will now be described, by way of example, with reference to the accompanying drawing in which.

DETAILED DESCRIPTION OF THE INVENTION

Figure 1:
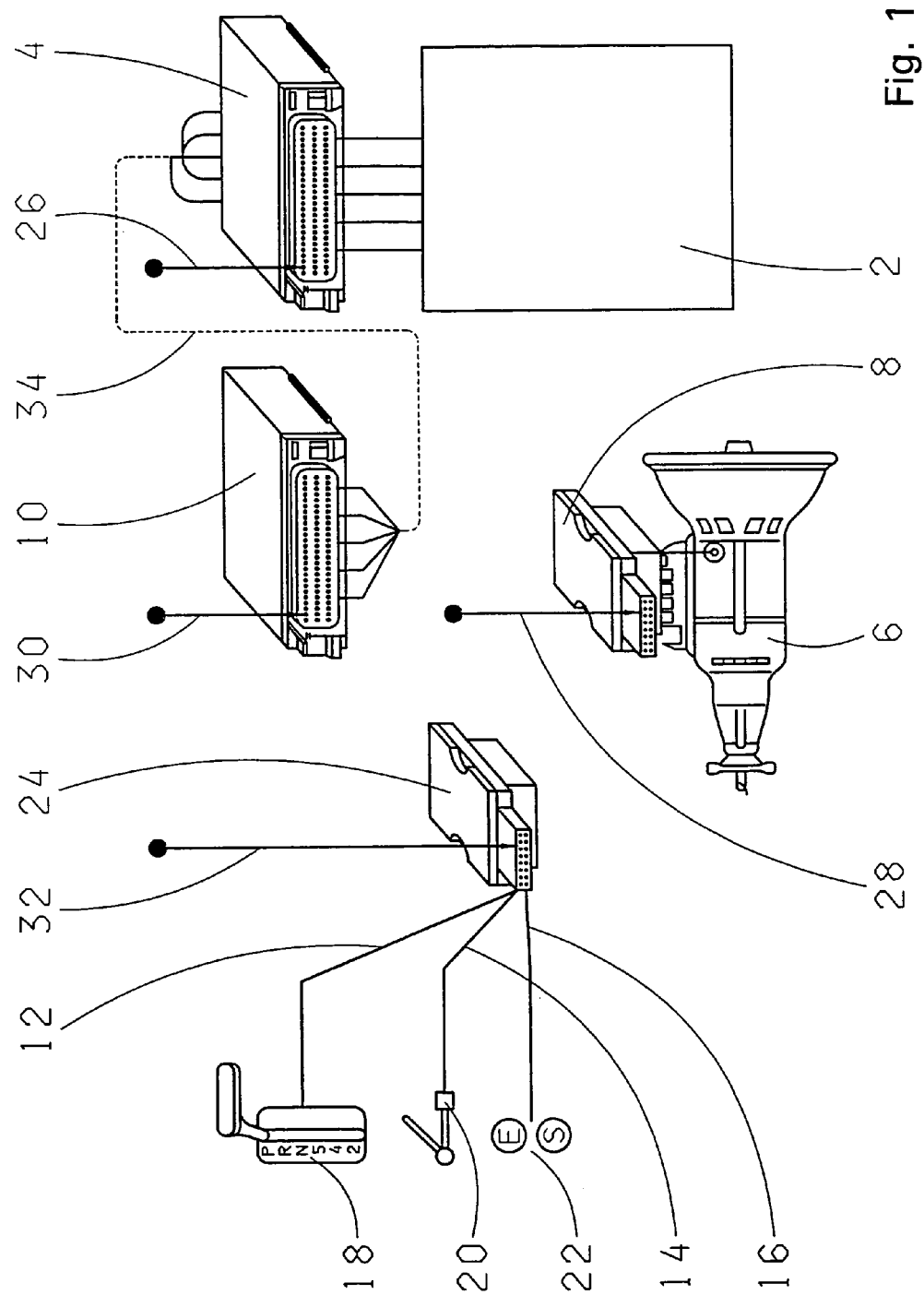
FIG. 1 shows a device for wireless communication in a vehicle.

FIG. 1 shows one motor 2 controlled by one motor control 4. One transmission 6 is controlled by a transmission control 8. With 10 is designated a central vehicle computer. By signal lines 12, 14, 16, one selector lever 18, one kick-down switch 20 and one drive program selector switch 22 are attached to one control device 24. By said operating elements the driver inputs his commands and wishes such as the drive steps P, R, N, S, 1 and 2, via the selector lever 18, the need of stronger acceleration via the kick-down switch 20 and the selection between an economy and a sport driving program via the drive program selector switch 22. To the motor control 4, the transmission control 8, the central vehicle computer 10 and the control device 24 are respectively attached antennae 26, 28, 30 and 32. According to a common transmission log book, signals are generated in the control device 24 which are either transmitted directly to the motor control 4 and the transmission control 8 or are conveyed via the central vehicle computer 10 where the control signals can be again worked up for which purpose they have been electronically processed according to specific computation rules. The motor control 4 can also be connected via a cable line 34 (here shown in dotted lines) with the central vehicle computer 10 whereby the whole transmission path of the communication between the control device 24 and the motor control 4 is split in two parts, one first part in which the communication is in wireless manner and, one second part in which the communication takes place via the cable line 34 or a CAN bus.

For example, now if the driver actuates the kick-down switch 20, there results a worked up signal relay to the transmission control 8 which optionally produces a change of the reduction ratio.

REFERENCE NUMERALS 2 motor
4 motor control
6 transmission
8 transmission control
10 vehicle computer
12 signal line
14 signal line
16 signal line
18 selector lever
20 kick-down switch
22 drive program selector switch
24 control device
26 antenna
28 antenna
30 antenna
32 antenna
34 cable line

The invention claimed is:

1. A communication device for communication along a communication path between control elements (18, 20, 22, 24), which are actuated by a driver of a vehicle and emit control signals, and controlled devices (4, 8) of the vehicle which receive the control signals and convert the control signals to responses in or on the controlled devices;
   wherein the control signals are transmitted in a wireless manner from the control elements (18, 20, 22, 24) to the controlled devices (4, 8) at least along a portion of the communication path, and one controlled device of the vehicle is the transmission control (8) for one of an automatic and automated transmission (6); and
   the communication path comprises a first portion and a second portion, and the first portion of the communication path is a wireless transmission between the control elements (18, 20, 22, 24) and an interpolated electronic control device (10) which controls further processing of the control signals according to prescribed computation rules and, during the second portion of the communication path, relays the control signals to at least the transmission control (4, 8).

2. The communication device according to claim 1, wherein the second portion of the communication path is a wireless transmission path.

3. The communication device according to claim 1, wherein the second portion of the communication path is a cable path (34).

4. The communication device according to claim 1, wherein the second portion of the communication path is a bus system.

5. The communication device according to claim 1, wherein the interpolated electronic control device is a central vehicle computer (10).

6. The communication device according to claim 1, wherein the second portion of the communication path is a CAN bus system.

7. A communication device for communicating over a communication path, the communication device comprising:
   a plurality of vehicle control elements (18, 20, 22, 24) which are actuated by a driver of a vehicle and emit control signals for controlling operation of the vehicle;
   a plurality of controlled devices (4, 8) of the vehicle which receive the control signals from the plurality of control elements (18, 20, 22, 24) and convert the control signals to control operation of the vehicle, the control signals being transmitted in a wireless manner from at least one of the plurality of control elements (18, 20, 22, 24) to at least one of the plurality of controlled devices (4, 8) along the communication path, and at least one of the plurality of controlled devices (4, 8) is a motor control (4) and at least one of the plurality of devices (4, 8) is a transmission control (8) for one of an automatic and an automated transmission (6); and
   the communication path comprises a first portion and a second portion, and the first portion of the communication path is a wireless transmission between the control elements (18, 20, 22, 24) and an interpolated electronic control device (10) which controls further processing of the control signals according to prescribed computation rules and, during the second portion of the communication path, relays the control signals to at least the transmission control (4, 8).

8. The communication device according to claim 7, wherein the second portion of the communication path is a wireless transmission path.

9. The communication device according to claim 7, wherein the second portion of the communication path is a cable path (34).

10. The communication device according to claim 7, wherein the second portion of the communication path is a bus system.

11. The communication device according to claim 7, wherein the interpolated electronic control device is a central vehicle computer (10).

12. The communication device according to claim 7, wherein the second portion of the communication path is a CAN bus system.

* * * * *